(12) United States Patent
Guinart et al.

(10) Patent No.: US 12,716,986 B2
(45) Date of Patent: Aug. 25, 2026

(54) METHOD FOR DETECTING A CHANGE IN LOCATION OF AT LEAST ONE WHEEL OF A MOTOR VEHICLE

(71) Applicant: Continental Automotive Technologies GmbH, Hannover (DE)

(72) Inventors: Nicolas Guinart, Toulouse (FR); Jean-Philippe Boisset, Toulouse (FR); Sylvain Godet, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 363 days.

(21) Appl. No.: 18/024,555

(22) PCT Filed: Sep. 2, 2021

(86) PCT No.: PCT/EP2021/074289
§ 371 (c)(1),
(2) Date: Mar. 3, 2023

(87) PCT Pub. No.: WO2022/049209
PCT Pub. Date: Mar. 10, 2022

(65) Prior Publication Data

US 2023/0333200 A1 Oct. 19, 2023

(30) Foreign Application Priority Data

Sep. 4, 2020 (FR) ...................................... 2008997

(51) Int. Cl.
*G01S 5/02* (2010.01)

(52) U.S. Cl.
CPC .......... *G01S 5/0269* (2020.05); *G01S 5/0278* (2013.01); *G01S 2205/01* (2020.05)

(58) Field of Classification Search
None
See application file for complete search history.

(56) References Cited

U.S. PATENT DOCUMENTS 6,469,621 B1 10/2002 Vredevoogd et al.
6,489,888 B1 12/2002 Honeck et al.
(Continued)

FOREIGN PATENT DOCUMENTS

CN 102712228 A 10/2012
CN 102791499 A 11/2012
(Continued)

OTHER PUBLICATIONS

English Translation of the Written Opinion for International Application No. PCT/EP2021/073505, mailed Oct. 21, 2021, 6 pages.
(Continued)

*Primary Examiner* — Whitney Moore
(74) *Attorney, Agent, or Firm* — Buchanan Ingersoll & Rooney PC

(57) ABSTRACT

A method for detecting a change in location of at least one wheel of a motor vehicle, the vehicle having at least one central processing unit, one wheel unit which includes an electronic assembly of sensors and which is mounted on the wheel, and one bidirectional communications assembly. The method notably includes a first comparison step, during which a first evaluation pattern is compared with a first reference pattern to determine whether the location of the wheel has changed, the patterns being representative of the effective location of the wheel unit in the motor vehicle.

18 Claims, 5 Drawing Sheets

(56) References Cited

U.S. PATENT DOCUMENTS

| | | | |
|---|---|---|---|
| 8,978,460 B2 | 3/2015 | Kretschmann | |
| 10,449,810 B2 | 10/2019 | Guinart et al. | |
| 2003/0020604 A1 | 1/2003 | Fischer et al. | |
| 2005/0178193 A1 | 8/2005 | Kuchler | |
| 2005/0187667 A1 | 8/2005 | Vredevoogd et al. | |
| 2006/0012475 A1 | 1/2006 | Froitzheim et al. | |
| 2006/0187013 A1 | 8/2006 | Jost | |
| 2006/0274302 A1 | 12/2006 | Shylanski et al. | |
| 2009/0192669 A1 | 7/2009 | Vassilieff | |
| 2011/0304451 A1* | 12/2011 | Lickfelt | B60C 23/0445 340/442 |
| 2012/0029767 A1 | 2/2012 | Bailie et al. | |
| 2012/0316829 A1 | 12/2012 | Kessler et al. | |
| 2012/0323529 A1 | 12/2012 | Kessler et al. | |
| 2015/0057878 A1 | 2/2015 | Friel et al. | |
| 2016/0229382 A1 | 8/2016 | Mathieu et al. | |
| 2017/0190224 A1 | 7/2017 | Araya | |
| 2018/0312021 A1 | 11/2018 | Liu | |
| 2019/0241031 A1 | 8/2019 | Billy et al. | |
| 2019/0329605 A1 | 10/2019 | Fischer et al. | |
| 2021/0268849 A1 | 9/2021 | Kretschmann et al. | |
| 2023/0160920 A1 | 5/2023 | Kosugi et al. | |
| 2023/0286336 A1 | 9/2023 | Guinart et al. | |

FOREIGN PATENT DOCUMENTS

| | | |
|---|---|---|
| CN | 105307913 A | 2/2016 |
| CN | 107031316 A | 8/2017 |
| CN | 107428213 A | 12/2017 |
| CN | 109562660 A | 4/2019 |
| CN | 110023111 A | 7/2019 |
| CN | 110682744 A | 1/2020 |
| CN | 116323261 A | 6/2023 |
| DE | 102011004561 A1 | 8/2012 |
| DE | 102015115731 A1 | 3/2017 |
| EP | 1 052 119 A1 | 11/2000 |
| EP | 2537689 A1 | 12/2012 |
| GB | 1 408 909 A | 10/1975 |
| WO | 2012139711 A1 | 10/2012 |
| WO | 2019092052 A1 | 5/2019 |
| WO | 2019243374 A1 | 12/2019 |

OTHER PUBLICATIONS

English Translation of the Written Opinion for International Application No. PCT/EP2021/073463, mailed Oct. 19, 2021, 6 pages.

Non Final Office Action for U.S. Appl. No. 18/024,561, dated Jul. 5, 2023, 25 pages.

Final Office Action for U.S. Appl. No. 18/024,561, mailed Aug. 30, 2023, 21 pages.

Notice of Allowance for U.S. Appl. No. 18/024,551, mailed Sep. 1, 2023, 8 pages.

International Search Report and Written Opinion for International Application No. PCT/EP2021/073505, mailed Oct. 21, 2021 with translation, 8 pages.

International Search Report and Written Opinion for International Application No. PCT/EP2021/073505, mailed Oct. 21, 2021, 12 pages (French).

French Search Report for French Application No. 2008995, dated Jun. 9, 2021 with translation, 9 pages.

International Search Report and Written Opinion for International Application No. PCT/EP2021/074289, mailed Oct. 1, 2021, 7 pages.

International Search Report and Written Opinion for International Application No. PCT/EP2021/074289, mailed Oct. 1, 2021, 11 pages (French).

French Search Report for French Application No. 2008997, dated Apr. 20, 2021 with translation, 9 pages.

International Search Report and Written Opinion for International Application No. PCT/EP2021/073463, mailed Oct. 19, 2021, 7 pages.

International Search Report and Written Opinion for International Application No. PCT/EP2021/073463, mailed Oct. 19, 2021, 11 pages (French).

French Search Report for French Application No. 2008998, dated Jul. 5, 2021 with translation, 9 pages.

Notice of Allowance issued by the U.S. Patent and Trademark Office in the U.S. Appl. No. 18/024,561, mailed Apr. 24, 2024, U.S. Patent and Trademark Office, Alexandria, VA. (9 pages).

Office Action (The First Office Action) issued Jul. 15, 2025, by the State Intellectual Property Office of People's Republic of China in corresponding Chinese Patent Application No. 202180054322.2 and an English translation of the Office Action. (19 pages).

Weihua et al., "Improvement Method of TPMS Autolocation Based on Field Intensity Technology", China National Knowledge, Automobile Technology, (Aug. 24, 2026), 6 pages.

Office Action (The First Office Action) issued Apr. 27, 2025, by the State Intellectual Property Office of People's Republic of China in the Chinese Patent Application No. 202180054350.4 and an English translation of the Office Action. (18 pages).

* cited by examiner

METHOD FOR DETECTING A CHANGE IN LOCATION OF AT LEAST ONE WHEEL OF A MOTOR VEHICLE

CROSS REFERENCE TO RELATED APPLICATIONS

This application is the U.S. National Phase Application of PCT International Application No. PCT/EP2021/074289, filed Sep. 2, 2021, which claims priority to French Patent Application No. 2008997, filed Sep. 4, 2020, the contents of such applications being incorporated by reference herein.

FIELD OF THE INVENTION

The present patent application relates to a method for detecting a change in location of at least one wheel of a motor vehicle, this method having applications notably in the field of equipment for motor vehicles.

BACKGROUND OF THE INVENTION

For safety reasons, it is known practice for a motor vehicle to be fitted with a monitoring system known by the abbreviation "TPMS" (Tire Pressure Monitoring System).

Such a monitoring system generally has a central processing unit, wheel units, each of which equips an associated wheel of the vehicle, and a radiofrequency communications assembly suitable for ensuring communication between each wheel unit and the central processing unit.

The central unit has an electronic processor known by the abbreviation "ECU" (Electronic Control Unit).

Each wheel unit comprises an electronic assembly of sensors in order notably to detect an anomaly with the wheel. These sensors may, for example, be a tire inflation pressure sensor, a temperature sensor and a wheel acceleration sensor.

In addition, each wheel unit has a battery and a memory.

The communications assembly makes it possible to exchange messages, or signals, bidirectionally between the central unit, and/or a mobile terminal, and each wheel unit. The messages notably include data representative of the operating parameters of each wheel and an identification code for each wheel unit.

The communication is done according to a communication protocol for the short-range bidirectional exchange of data using ultra-high-frequency, or "UHF", radio waves, for example according to a communication protocol of Bluetooth® type.

It is essential to know the location of each wheel unit on the various wheels of the vehicle in order to utilize the data transmitted by the wheel units. More particularly, the location information is necessary in order to know what recommended pressure threshold must be applied, depending on whether it is a question of a front wheel or a rear wheel, and also to display the current pressure values at the associated wheel.

The location of the wheel units in relation to a wheel location in the vehicle is generally verified at the start of a new running cycle and requires, according to the existing prior art, periodic transmissions of messages synchronized with a determined angular position from the wheel unit to the central unit.

To that end, notably known is document WO 2012/139711, incorporated herein by reference, which describes a method for locating the wheels of a motor vehicle by synchronized messages.

The power necessary to transmit the messages from each wheel unit is supplied by the battery associated with the emitting wheel unit.

However, the battery of each wheel unit has a limited service life and is not intended to be recharged. It is therefore imperative to limit the power consumption in order to optimize the service life of the battery of each wheel unit.

In addition, it is noted that, when the location of the wheel units is verified at the start of each running cycle, this produces an unchanged result for the location of the wheel units most of the time. This is because the wheels are changed or switched over only once or twice per year on average, notably when there is a changeover between winter tires and summer tires, which is a proportion of the effective change in the location of the rear wheel units that represents less than one percent of the wheel unit location procedures.

Also known is a method for verifying a change in location of the wheel units, described in document US 2011/0304451, incorporated herein by reference, which queries each wheel unit when the engine is started up in order to determine whether the location of the wheel units has changed since the last time the engine was started up.

Although such a method makes it possible to limit the procedures for verifying the location of the wheel units, this method is complex to implement and requires an assembly of supplementary components for each wheel unit, such as a dedicated low-frequency antenna, a low-frequency controller, and dedicated wiring.

The existing prior art does not provide a simple and reliable solution ensuring the detection of a change in location of the wheel units with a low expense in terms of power.

SUMMARY OF THE INVENTION

An aspect of the present invention notably aims to resolve these drawbacks.

This objective, and others that will become apparent from reading the following description, is achieved by a method for detecting a change in location of at least one wheel of a motor vehicle, said vehicle having at least:

one central processing unit, one wheel unit which comprises an electronic assembly of sensors and which is mounted on said wheel of the motor vehicle, and one means for measuring the angular position of said wheel, and one bidirectional radiofrequency communications assembly designed to ensure communication between the wheel unit and the central unit, characterized in that the method comprises at least:

a first preliminary configuration step, during which the wheel unit emits a series of messages to the central unit via the communications assembly, the series of messages being emitted when the vehicle is running, conforming to synchronization with the angular position of the associated wheel, and the central unit establishes and records a first reference pattern representative of the location of the wheel unit in the motor vehicle, by measuring the power of said received messages, a first transmission step, during which the wheel unit reproduces the emission of the series of messages emitted during the first preliminary configuration step, a first evaluation step, performed by the central unit, during which a first evaluation pattern is established by the central unit by measuring the power of the series of messages received during the first transmission step, and a first comparison step, performed by the central unit, during which the first evaluation pattern is compared with the first reference pattern to determine whether the location of the wheel has changed.

Thus, the method according to an aspect of the invention offers a simple and effective way of limiting the number of procedures for locating the wheel units and consequently limiting the depletion of the battery of each wheel unit.

According to other optional features of the method according to an aspect of the invention, taken individually or in combination:

the synchronization of the emission of said series of messages with the angular position of the associated wheel consists in emitting said messages successively with an inter-message delay that is determined according to the rotational speed of the wheel, so as to cover at least one revolution of the wheel concerned;

the rotational speed of the wheel is provided by a speed sensor which is mounted on the vehicle in the vicinity of the associated wheel. This feature makes it possible to avoid depleting a wheel-speed measurement means powered by the battery of the wheel unit;

the rotational speed of the wheel is provided by a means for measuring the angular position of said wheel, which means is an accelerometer mounted on the associated wheel unit;

the synchronization of the emission of said series of messages with the angular position of the associated wheel consists in emitting said messages successively according to predetermined instantaneous angular orientations of the wheel which are supplied by the means for measuring the angular position of the wheel;

the method comprises at least:

a second preliminary configuration step, during which the central unit emits a series of messages to the wheel unit via the communications assembly, the series of messages being emitted when the vehicle is running, conforming to synchronization with the angular position of the associated wheel, and the wheel unit establishes and records a second reference pattern representative of its location in the motor vehicle, by measuring the power of said received messages, a second transmission step, during which the central unit reproduces the emission of the series of messages emitted during the second preliminary configuration step, a second evaluation step, during which a second evaluation pattern is established by the wheel unit by measuring the power of the series of messages emitted during the second transmission step, and a second comparison step, during which the second evaluation pattern is compared with the second reference pattern by the wheel unit to determine whether the location of the wheel has changed. This feature, by doubling the emissions of messages, enables the method to be made more reliable;

said motor vehicle has a plurality of central processing units, each central unit being designed to communicate with the at least one wheel unit via the bidirectional communications assembly to consolidate said reference patterns and said evaluation patterns;

said messages making it possible to establish said reference patterns and said evaluation patterns each comprise an identification reference. Thus, should a message be lost, it is possible to recover it using its identification reference;

the method comprises a locating step which aims to determine the location of the wheel on the motor vehicle and which is performed if the location of the wheel has been estimated to have changed during the first comparison step and/or the second comparison step;

the method is applied to a motor vehicle that has a plurality of wheels which are each associated with a wheel unit.

An aspect of the invention also relates to a motor vehicle comprising at least one central processing unit, one wheel unit which comprises an electronic assembly of sensors and which is mounted on a wheel of the motor vehicle, and one bidirectional radiofrequency communications assembly designed to ensure communication between the wheel unit and the central unit, characterized in that said central unit and/or said wheel unit and/or said communications assembly are suitably programmed to implement the method described hereinabove.

BRIEF DESCRIPTION OF THE DRAWINGS

Other features and advantages of aspects of the invention will become apparent on reading the following description, with reference to the appended figures, in which.

For greater clarity, identical or similar elements are denoted by identical or similar reference signs throughout the figures.

DESCRIPTION OF THE PREFERRED EMBODIMENTS

Figure 1:
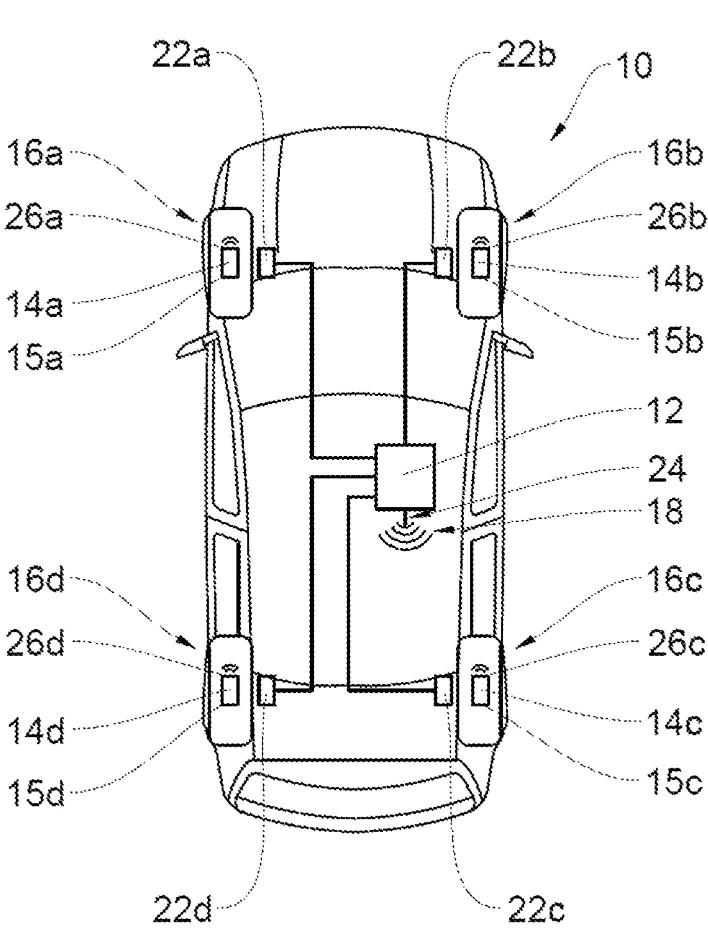
FIG. 1: is a schematic view of a motor vehicle equipped with units of a communications assembly, to which vehicle the method according to an aspect of the invention is applied.

FIG. 1 depicts a motor vehicle 10 which is equipped with a central processing unit 12, with four wheel units 14*a*, 14*b*,

14*c*, 14*d* which are each mounted on an associated wheel 16*a*, 16*b*, 16*c*, 16*d*, and with a bidirectional communications assembly 18.

The central unit 12 notably includes an electronic processor known by the abbreviation "ECU" (Electronic Control Unit), and a memory.

Each wheel unit 14*a*, 14*b*, 14*c*, 14*d* comprises an electronics housing containing a collection of sensors which are dedicated to measuring parameters such as the pressure and the temperature of the tire fitted to the associated wheel. Each wheel unit 14*a*, 14*b*, 14*c*, 14*d* also comprises a battery and a memory (which are not depicted).

In addition, each wheel unit 14*a*, 14*b*, 14*c*, 14*d* comprises an accelerometer 15*a*, 15*b*, 15*c*, 15*d* which constitutes a first means for measuring the rotational speed of the associated wheel 16*a*, 16*b*, 16*c*, 16*d*. Each accelerometer 15*a*, 15*b*, 15*c*, 15*d* is capable of supplying modulated signals indicative of the values of gravity, and therefore of its angular position, and of which the frequency, equal to the frequency of rotation of the wheels, also makes it possible to calculate the rotational speed of the associated wheel 16*a*, 16*b*, 16*c*, 16*d*.

The motor vehicle 10 also comprises four speed sensors 22*a*, 22*b*, 22*c*, 22*d* which form a second means for measuring the rotational speed of the associated wheel 16*a*, 16*b*, 16*c*, 16*d*. The speed sensors 22*a*, 22*b*, 22*c*, 22*d* are mounted in the vicinity of each associated wheel 16*a*, 16*b*, 16*c*, 16*d* and are capable of transmitting the instantaneous angular position and speed of the associated wheel to the central unit 12 via the communications assembly 18.

The communications assembly 18 makes it possible to exchange messages, or signals, bidirectionally between the central unit 12 and each wheel unit 14*a*, 14*b*, 14*c*, 14*d*.

For that purpose, the communications assembly 18 comprises an emitter-receiver 24 which is associated with the central unit 12 and four emitter-receivers 26*a*, 26*b*, 26*c*, 26*d* which are each associated with one wheel unit 14*a*, 14*b*, 14*c*, 14*d* respectively.

The messages exchanged between the central unit 12 and each wheel unit 14*a*, 14*b*, 14*c*, 14*d* notably comprise data indicative of operating parameters of each wheel 16*a*, 16*b*, 16*c*, 16*d* and an identification code for each wheel unit 14*a*, 14*b*, 14*c*, 14*d*.

The communication is done according to a communication protocol for the short-range bidirectional exchange of data using ultra-high-frequency, or "UHF". As a preference, the method according to an aspect of the invention adopts a communications protocol of the Bluetooth® type which allows immediate emission of a message referred to as a "scan request" in response to a received message known as "advertising".

Figure 2:
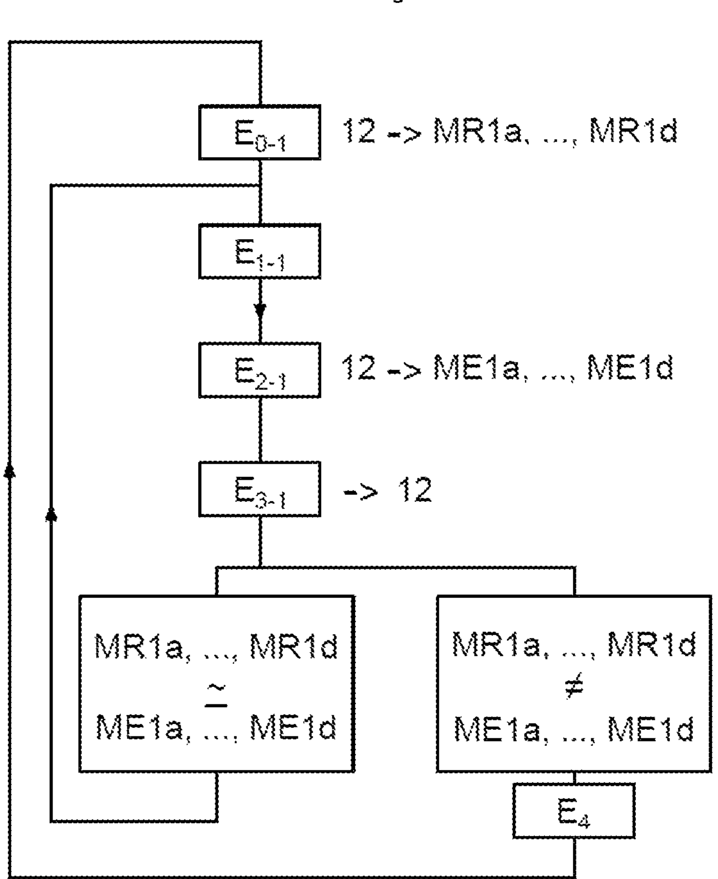
FIG. 2: is a flowchart of a first embodiment of the method according to the invention.

The method for detecting a change in location of the wheels, according to a first embodiment of the invention illustrated in FIG. 2, comprises a first preliminary configuration step E0-1, during which each wheel unit 14*a*, 14*b*, 14*c*, 14*d* emits a series of messages to the central unit 12 via the communications assembly 18. According to the embodiment described, a series of messages comprises twenty messages.

The first preliminary step E0-1 is performed at the end of a first procedure of locating the wheel units 14*a*, 14*b*, 14*c*, 14*d*, which follows on from an initialization or, repetitively, from a location update demand following detection of a change in location of at least one wheel unit 14*a*, 14*b*, 14*c*, 14*d*. The location procedure makes it possible to establish the reference position for each wheel unit 14*a*, 14*b*, 14*c*, 14*d*.

The central unit 12 establishes and records in its memory a first reference pattern MR1*a*, MR1*b*, MR1*c*, MR1*d* respectively illustrated in FIGS. 3 to 6, which is indicative of the location of the relevant wheel unit 14*a*, 14*b*, 14*c*, 14*d* in the motor vehicle 10. The starting assumption is that the location of each wheel 16*a*, 16*b*, 16*c*, 16*d* is known and correct at the time at which the reference patterns are established.

Figure 3:
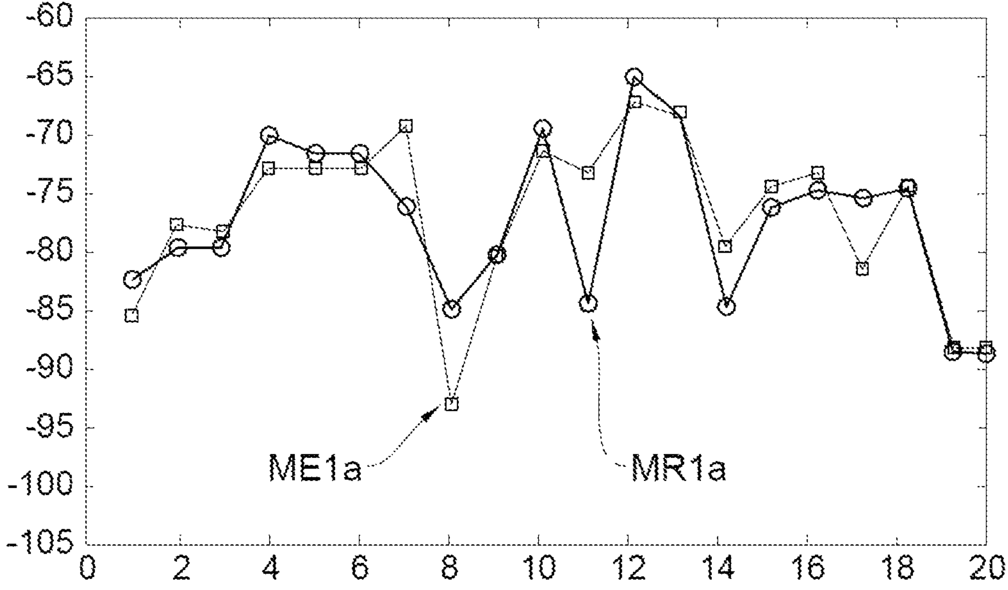
FIG. 3: depicts, in the form of a graph, the first reference pattern and the first evaluation pattern which are associated with the front left wheel of a vehicle where the location of the wheel concerned is unchanged.
Figure 4:
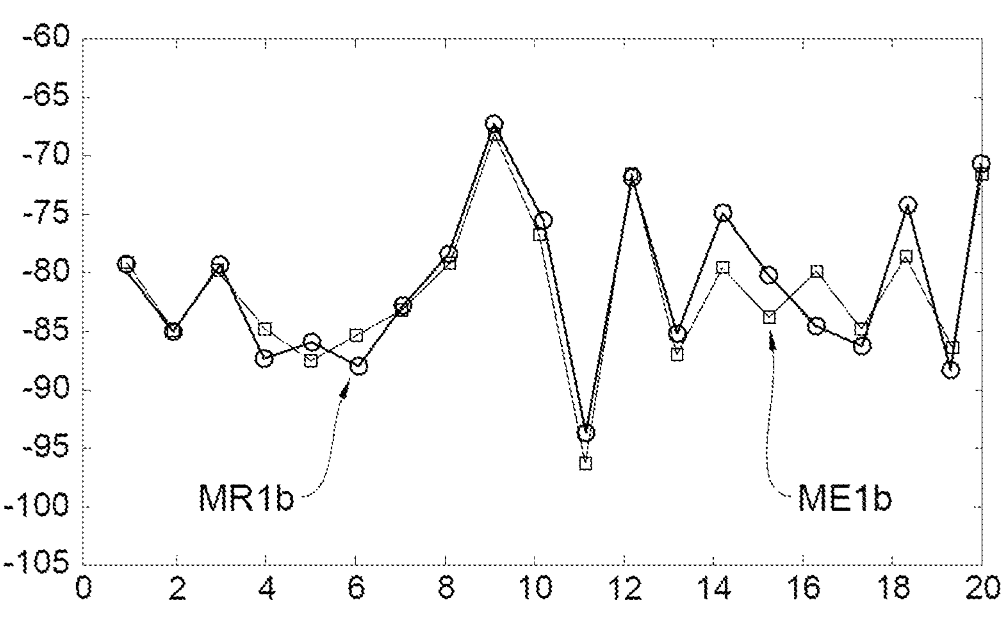
FIG. 4: depicts, in the form of a graph, the first reference pattern and the first evaluation pattern which are associated with the front right wheel of a vehicle where the location of the wheel concerned is unchanged.
Figure 5:
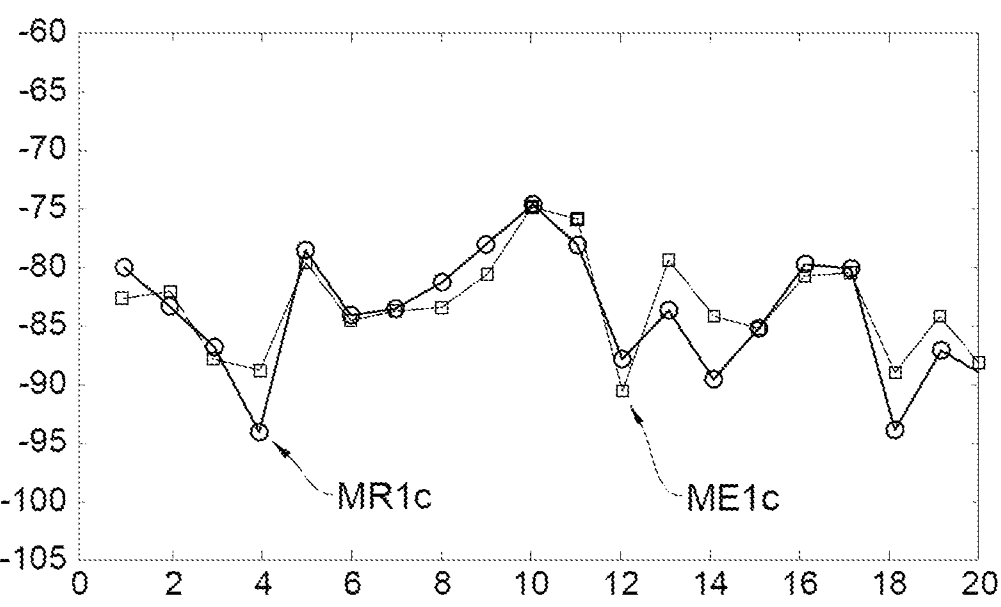
FIG. 5: depicts, in the form of a graph, the first reference pattern and the first evaluation pattern which are associated with the rear left wheel of a vehicle where the location of the wheel concerned is unchanged.
Figure 6:
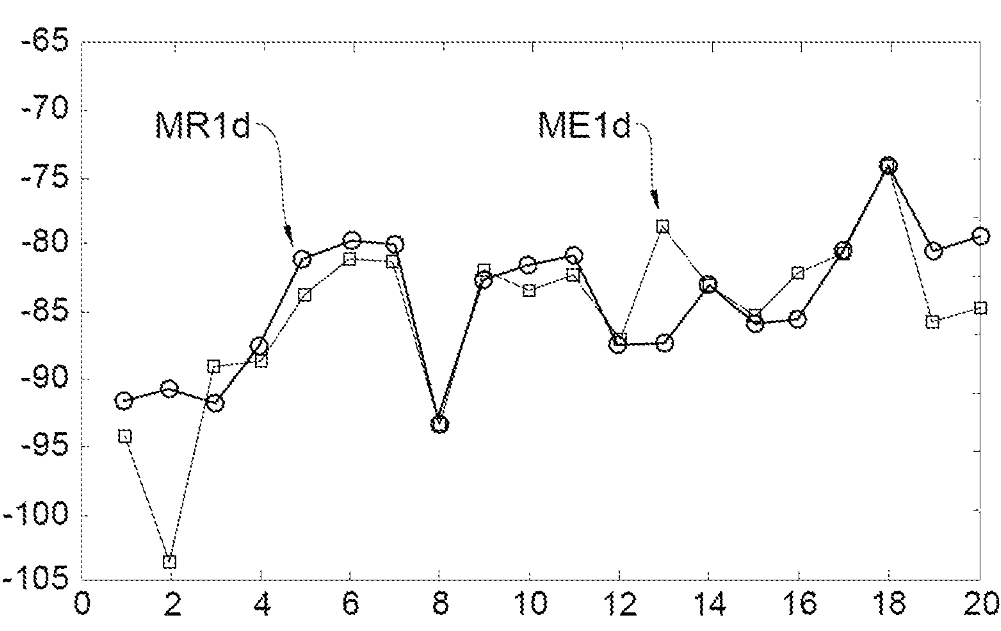
FIG. 6: depicts, in the form of a graph, the first reference pattern and the first evaluation pattern which are associated with the rear right wheel of a vehicle where the location of the wheel concerned is unchanged.

More specifically, the first reference pattern MR1*a*, corresponding to the front left wheel 16*a* which is illustrated in FIG. 3, the first reference pattern MR1*b*, corresponding to the front right wheel 16*b* which is illustrated in FIG. 4, the first reference pattern MR1*c* corresponding to the rear right wheel 16*c* which is illustrated in FIG. 5, and the first reference pattern MR1*d*, corresponding to the rear left wheel 16*d* which is illustrated in FIG. 6.

Each first reference pattern MR1*a*, MR1*b*, MR1*c*, MR1*d* is established by measuring the power of the messages received previously during the first preliminary configuration step E0-1.

The power of the received messages is known in telecommunications by the acronym RSSI, which stands for Received Signal Strength Indication and which is a measure of the power of a received signal on reception, and gives an indication as to the signal strength of the received signal. This measure of power is expressed in "dBm", which is an abbreviation for the ratio of the power in decibels between the measured power and one milliwatt.

Thus, a "pattern" means a characteristic signature of the messages, or signals, transmitted by a wheel unit 14*a*, 14*b*, 14*c*, 14*d* or by the central unit 12. Each pattern is indicative of the location, in the motor vehicle 10, of the associated wheel unit 14*a*, 14*b*, 14*c*, 14*d* that emits or receives the messages.

As may be seen in FIGS. 3 to 6, the first reference pattern MR1*a*, MR1*b*, MR1*c*, MR1*d* takes the form of a depiction in the form of a graph, with the abscissa axis indicating the rank of the "RSSI" measurement from a predefined maximum set of synchronized emissions of messages, in this instance twenty, and the ordinate axis indicating the power, or "RSSI", of the messages or signals, measured in dBm.

According to the embodiment described in the present description, each first reference pattern MR1*a*, MR1*b*, MR1*c*, MR1*d* comprises twenty synchronized "RSSI" measurements per revolution of the wheel.

As a preference, the emissions of messages are evenly distributed over a wheel revolution of 360 degrees.

However, there may be technical limitations on achieving this preference. For example, in the event that the vehicle speed is too high, there may not be enough time to emit twenty messages that are evenly distributed over one single revolution of the wheel. In that case, it is possible to distribute the emissions over several revolutions. Moreover, there is nothing to rule against a non-uniform angular distribution of the emissions of the messages. As a generalization, it is enough for the rank of the emission of the message to be associated with an angular position defined in advance or on the spot and stored by the emitter so that the emissions of messages can be reproduced from the reference pattern for the next evaluation pattern. For example, it is conceivable to emit a series of messages over several revolutions of the wheel, with emissions of different rank nevertheless being ultimately synchronized to identical angular positions.

Still according to the first embodiment of the invention, the method comprises a first transmission step E1-1, during which each wheel unit 14*a*, 14*b*, 14*c*, 14*d* re-emits the series of messages emitted during the first preliminary configuration step E0-1, to the central unit 12.

The first transmission step E1-1 is followed by a first evaluation step E2-1, during which the central unit 12 establishes a first evaluation pattern ME1*a*, ME1*b*, ME1*c*, ME1*d* respectively, these patterns been depicted in FIGS. 3 to 6, by measuring the power of the series of messages received during the previous first transmission step E1-1.

More specifically, the first evaluation pattern ME1*a*, corresponding to the front left wheel 16*a* which is illustrated in FIG. 3, the first evaluation pattern ME1*b*, corresponding to the front right wheel 16*b* which is illustrated in FIG. 4, the first evaluation pattern ME1*c* corresponding to the rear right wheel 16*c* which is illustrated in FIG. 5, and the first evaluation pattern ME1*d*, corresponding to the rear left wheel 16*d* which is illustrated in FIG. 6.

The messages, which make it possible to establish the reference patterns and said evaluation patterns, each comprise an identification reference. This identification reference makes it possible to identify each message notably so as to establish the evaluation patterns and the reference patterns in identical manners. Because of the haphazard nature of wireless communications, it may happen that certain messages are not received. Identifying each message in a series allows each wheel unit to realign the evaluation patterns and the reference patterns in pairs and to reject singletons.

This feature makes it possible to overcome the problem of a non-received message and continue the procedure in an adequate downgraded mode.

After the first evaluation step E2-1, the method comprises a first comparison step E3-1 during which the central unit 12 compares each first evaluation pattern ME1*a*, ME1*b*, ME1*c*, ME1*d* with the associated first reference pattern MR1*a*, MR1*b*, MR1*c*, MR1*d* recorded in its memory, in order to determine whether the wheel 16*a*, 16*b*, 16*c*, 16*d* concerned has changed location in the motor vehicle 10.

According to one preferred embodiment, each first evaluation pattern ME1*a*, ME1*b*, ME1*c*, ME1*d* is compared with the associated first reference pattern MR1*a*, MR1*b*, MR1*c*, MR1*d* by an algorithm based on a least-squares method.

Figure 7:
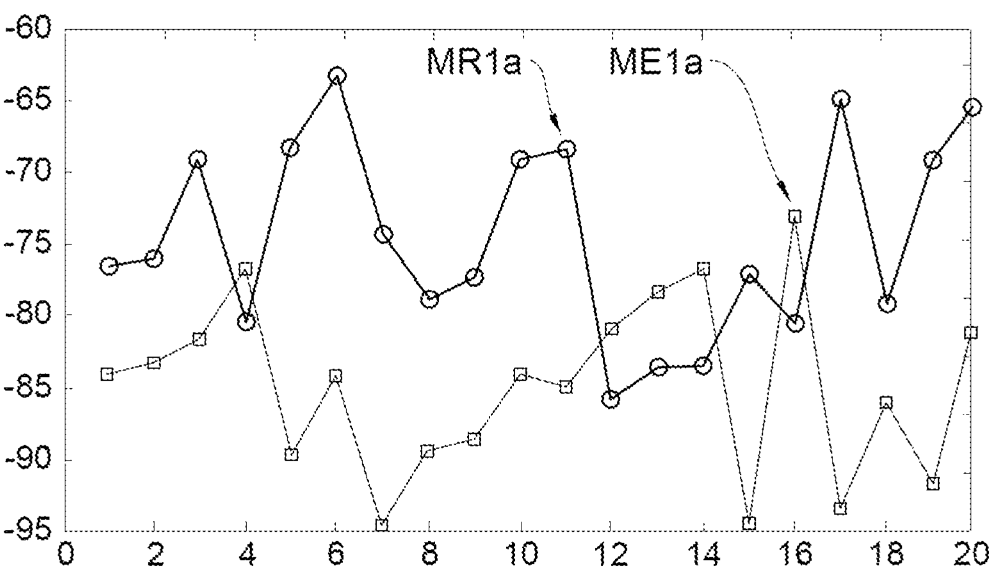
FIG. 7: depicts, in the form of a graph, the first reference pattern and the first evaluation pattern which are associated with the front right wheel of a vehicle where the location of the wheel concerned has changed.

If the distance between each first evaluation pattern ME1*a*, ME1*b*, ME1*c*, ME1*d* and the associated first reference pattern MR1*a*, MR1*b*, MR1*c*, MR1*d* exceeds a predetermined decision threshold, as illustrated in FIG. 7, the algorithm concludes that the wheel 16*a*, 16*b*, 16*c*, 16*d* concerned has changed location and a location step E4 for locating the wheels 16*a*, 16*b*, 16*c*, 16*d* of the motor vehicle 10 is executed. This location step E4, which is known from the prior art, is not at the heart of an aspect of the present invention and will therefore not be described further in detail Conversely, with reference to FIGS. 3 to 6, if the distance between each first evaluation pattern ME1*a*, ME1*b*, ME1*c*, ME1*d* and the associated first reference pattern MR1*a*, MR1*b*, MR1*c*, MR1*d* does not exceed the predetermined decision threshold, the algorithm concludes that the location of the wheel 16*a*, 16*b*, 16*c*, 16*d* concerned has not varied, and a location step E4 for locating the wheels 16*a*, 16*b*, 16*c*, 16*d* is therefore not required.

The decision threshold is predetermined according to the number of measurements performed for establishing the first evaluation pattern ME1*a*, ME1*b*, ME1*c*, ME1*d* per revolution of the wheel, and also according to the measurement noise level, measured in "dBm". The measurement noise level is not necessarily known in advance and so a threshold, for example 10 dBm, is fixed in advance. Nonlimitingly, it is possible to evaluate the noise in order to adjust the decision threshold more accurately.

Still according to the first embodiment of the invention, the series of messages which is emitted during the course of the first configuration step E0-1 and the first transmission step E1-1 is emitted when the vehicle 10 is running and conforming to synchronization with the angular position of the associated wheel.

According to a first variant of the first embodiment of the invention, the synchronization of the emission of the series of messages with the angular position of the associated wheel 16*a*, 16*b*, 16*c*, 16*d* consists in emitting the messages successively with a uniform inter-message delay that is determined according to the rotational speed of the associated wheel 16*a*, 16*b*, 16*c*, 16*d*, so as to cover at least one revolution of the wheel concerned. For example, the inter-message delay is calculated at fifteen milliseconds, so that the twenty messages are emitted uniformly at angular positions of the wheel that are successively offset by eighteen degrees of angle. It will be noted that an inter-message delay of fifteen milliseconds corresponds approximately to a speed of the motor vehicle 10 of twenty kilometers per hour. For a speed of the motor vehicle 10 of approximately sixty kilometers per hour, the inter-message delay is five milliseconds in order to obtain twenty measurements per revolution of the wheel.

The inter-message delay is calculated by each wheel unit concerned on the basis of the information relating to the rotational speed of the wheel as supplied by each associated speed sensor 22*a*, 22*b*, 22*c*, 22*d*.

Since the speed information from the speed sensors 22*a*, 22*b*, 22*c*, 22*d* is not directly accessible to the wheel unit 14*a*, 14*b*, 14*c*, 14*d*, it is the central unit 12 which transmits the speed information.

To that end, each wheel unit 14*a*, 14*b*, 14*c*, 14*d* emits the first message of the series at a non-defined emission angle, and the central unit 12 responds with a message providing information as to the rotational speed of the wheel as supplied by each associated speed sensor 22*a*, 22*b*, 22*c*, 22*d*, and then, from this speed information, each wheel unit 14*a*, 14*b*, 14*c*, 14*d* deduces the inter-message delay and therefore the moment at which to emit the next message in the series.

Nonlimitingly, the inter-message delay may also be calculated by each wheel unit 14*a*, 14*b*, 14*c*, 14*d* concerned on the basis of the information relating to the rotational speed of the wheel as supplied by each associated accelerometer 15*a*, 15*b*, 15*c*, 15*d*, which information is directly accessible to each wheel unit 14*a*, 14*b*, 14*c*, 14*d*.

Thus, the first message in the series of messages is emitted from each wheel unit 14*a*, 14*b*, 14*c*, 14*d* to the central unit 12 at a non-defined emission angle, the next messages being emitted in conformance with the determined inter-message duration. The central unit 12 may potentially reorganize the messages received in order to correspond to a defined angular-orientation order, by exploiting the information supplied by the associated speed sensor 22*a*, 22*b*, 22*c*, 22*d*.

According to a second variant of the first embodiment of the invention, the synchronization of the emission of the series of messages with the angular position of the associated wheel 16*a*, 16*b*, 16*c*, 16*d* consists in emitting said messages successively at predetermined instantaneous angular orientations which are supplied by each accelerometer 15*a*, 15*b*, 15*c*, 15*d* associated with the wheel 16*a*, 16*b*, 16*c*, 16*d* concerned.

This second embodiment variant, which relies on speed data supplied by the accelerometers 15*a*, 15*b*, 15*c*, 15*d*, avoids the potential problem of drifting of the angular reference of the speed sensors 22*a*, 22*b*, 22*c*, 22*d*.

Figure 8:
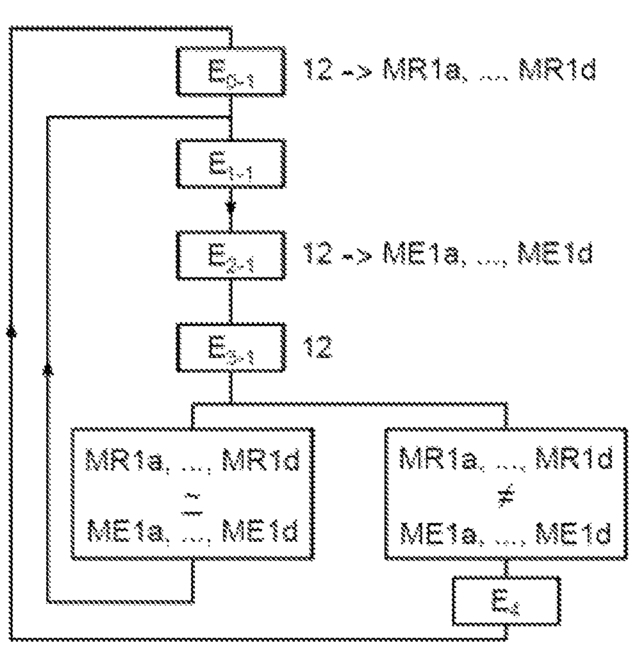
FIG. 8 illustrates a flowchart of a second embodiment of the method according to the invention.
Figure 8:
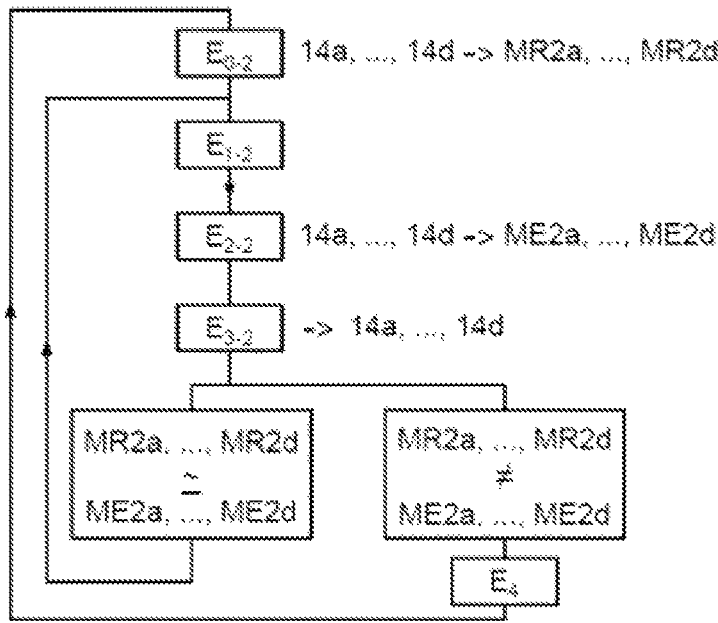

The detection method according to an aspect of the invention comprises a second embodiment, illustrated in FIG. 8, according to which the messages are sent from each wheel unit 14*a*, 14*b*, 14*c*, 14*d* to the central unit 12, as for the first embodiment described above, and also from the central unit 12 to each wheel unit 14*a*, 14*b*, 14*c*, 14*d*, so as to improve the robustness of the method.

More specifically, according to the second embodiment, the method includes a first preliminary configuration step E0-1, a first transmission step E1-1, a first evaluation step E2-1, and a first comparison step E3-1, these steps being identical to the steps with the same reference that are described above for the first embodiment and therefore not being described in detail in order not to unnecessarily overload the description.

In addition, according to the second embodiment illustrated in FIG. 8, the method comprises a second preliminary configuration step E0-2, during which the central unit 12 emits a series of messages to each wheel unit 14*a*, 14*b*, 14*c*, 14*d* in succession, via the communications assembly 18. The messages emitted by the central unit 12 during this second configuration step E0-2 are emitted as a response, or reaction, to the reception of the messages emitted by each wheel unit 14*a*, 14*b*, 14*c*, 14*d* during the first configuration step E0-1.

Each wheel unit 14*a*, 14*b*, 14*c*, 14*d* establishes and records a second reference pattern MR2*a*, MR2*b*, MR2*c*, MR2*d* (which are not depicted), which is representative of the location of the receiving wheel unit 14*a*, 14*b*, 14*c*, 14*d*, by measuring the power of the messages received during the second preliminary configuration step E0-2.

Still according to the second embodiment, the method includes a second transmission step E1-2, during which the central unit 12 re-emits the series of messages emitted during the previous second preliminary configuration step E0-2 to each wheel unit 14*a*, 14*b*, 14*c*, 14*d*.

The second transmission step E1-2 is followed by a second evaluation step E2-2, during which each wheel unit 14*a*, 14*b*, 14*c*, 14*d* establishes a second evaluation pattern ME2*a*, ME2*b*, ME2*c*, ME2*d* (these are not depicted) by measuring the power of the series of messages received during the previous second transmission step E1-2.

After the second evaluation step E2-2, the method includes a second comparison step E3-2, during which each wheel unit 14*a*, 14*b*, 14*c*, 14*d* compares the second evaluation pattern ME2*a*, ME2*b*, ME2*c*, ME2*d* with the associated second reference pattern MR2*a*, MR2*b*, MR2*c*, MR2*d* recorded in its memory, in order to determine whether the location of the wheel 16*a*, 16*b*, 16*c*, 16*d* concerned in the motor vehicle 10 has changed.

The second evaluation pattern ME2*a*, ME2*b*, ME2*c*, ME2*d* is compared with the associated second reference pattern MR2*a*, MR2*b*, MR2*c*, MR2*d* by an algorithm based on a least-squares method. If the distance between the second evaluation pattern ME2*a*, ME2*b*, ME2*c*, ME2*d* and the second reference pattern MR2*a*, MR2*b*, MR2*c*, MR2*d* exceeds a predetermined decision threshold, the algorithm concludes that the location of the wheel concerned has changed and a locating step E4 for locating the wheels 16*a*, 16*b*, 16*c*, 16*d* of the motor vehicle 10 is executed.

Conversely, if the distance between the second evaluation pattern ME2*a*, ME2*b*, ME2*c*, ME2*d* and the second reference pattern MR2*a*, MR2*b*, MR2*c*, MR2*d* does not exceed the predetermined decision threshold, the algorithm concludes that the location of the wheel 16*a*, 16*b*, 16*c*, 16*d* concerned has not varied, and the locating step E4 for locating the wheels 16*a*, 16*b*, 16*c*, 16*d* is therefore not required.

In the same way as for the first embodiment of the method, the decision threshold is predetermined, as is the number of messages emitted synchronously by the central unit 12.

According to the exemplary embodiment described here for the second embodiment of the invention, the priority is to detect a change in location of at least one wheel 16*a*, 16*b*, 16*c*, 16*d*. That is to say that the locating step E4 for locating the wheels 16*a*, 16*b*, 16*c*, 16*d* is necessary if the first comparison step E3-1 or the second comparison step E3-2 estimate that the location of one of the wheels has changed.

Conversely, in an embodiment variant, the locating step E4 for locating the wheels 16*a*, 16*b*, 16*c*, 16*d* is necessary if the first comparison step E3-1 and the second comparison step E3-2 estimate that the location of one of the wheels has changed.

According to another embodiment variant, not depicted, which is common to the two embodiments described hereinabove, the motor vehicle 10 comprises a plurality of central processing units 12 each suitable for communicating with each wheel unit 14*a*, 14*b*, 14*c*, 14*d*, by the bidirectional communications assembly 18. This variant makes it possible to multiply the "dimensions" of each reference pattern MR1*a*, MR1*b*, MR1*c*, MR1*d*, MR2*a*, MR2*b*, MR2*c*, MR2*d* and each evaluation pattern ME1*a*, ME1*b*, ME1*c*, ME1*d*, ME2*a*, ME2*b*, ME2*c*, ME2*d*, with a dimension for each central unit 12, by virtue of which each reference pattern MR1*a*, MR1*b*, MR1*c*, MR1*d*, MR2*a*, MR2*b*, MR2*c*, MR2*d* and each evaluation pattern ME1*a*, ME1*b*, ME1*c*, ME1*d*, ME2*a*, ME2*b*, ME2*c*, ME2*d* is consolidated.

The detection method according to an aspect of the invention proposes a reliable solution which offers a low level of false-negatives, which is to say of undetected changes in wheel location.

The method according to an aspect of the invention offers the advantage of not requiring active listening on the part of the wheel units 14*a*, 14*b*, 14*c*, 14*d*. Specifically, such listening would have a significant impact on the power consumption of the wheel units 14*a*, 14*b*, 14*c*, 14*d* and would also need to be activated at an opportune moment, thereby increasing the complexity of the method.

In addition, the method according to an aspect of the invention is particularly suitable for implementation in an environment of the BLE, which stands for "Bluetooth® Low Energy", type, and offers the option of bidirectional exchanges between the central unit(s) 12 and the wheel units 14*a*, 14*b*, 14*c*, 14*d*.

The invention claimed is:

1. A method for detecting a change in location of at least one wheel of a motor vehicle, said vehicle having at least:

one central processing unit, one wheel unit which comprises an electronic assembly of sensors and which is mounted on said wheel of the motor vehicle, and one means for measuring an angular position of said wheel, and one bidirectional radiofrequency communications assembly designed to ensure communication between the wheel unit and the central processing unit, wherein the method comprises at least:

a first preliminary configuration step, during which the wheel unit emits a series of messages to the central processing unit via the communications assembly, the series of messages being emitted when the vehicle is running, conforming to synchronization with the angular position of the associated wheel, and the central processing unit establishes and records a first reference pattern representative of the location of the wheel unit in the motor vehicle, by measuring the power of said received messages, a first transmission step, during which the wheel unit reproduces the emission of the series of messages emitted during the first preliminary configuration step, a first evaluation step, performed by the central processing unit, during which a first evaluation pattern is established by the central processing unit by measuring the power of the series of messages received during the first transmission step, and a first comparison step, performed by the central processing unit, during which the first evaluation pattern is compared with the first reference pattern to determine whether the location of the wheel has changed, wherein further comprising at least:

a second preliminary configuration step, during which the central unit emits a series of messages to the wheel unit via the communications assembly, the series of messages being emitted when the vehicle is running, conforming to synchronization with the angular position of the associated wheel, and the wheel unit establishes and records a second reference pattern representative of its location in the motor vehicle, by measuring the power of said received messages, a second transmission step, during which the central unit reproduces the emission of the series of messages emitted during the second preliminary configuration step, a second evaluation step, during which a second evaluation pattern is established by the wheel unit by measuring the power of the series of messages emitted during the second transmission step, a second comparison step, during which the second evaluation pattern is compared with the second reference pattern by the wheel unit to determine whether the location of the wheel has changed.

2. The detection method as claimed in claim 1, wherein the synchronization of the emission of said series of messages with the angular position of the associated wheel consists in emitting said messages successively with an inter-message delay that is determined according to the rotational speed of the wheel, so as to cover at least one revolution of the wheel concerned.

3. The detection method as claimed in claim 2, wherein the rotational speed of the wheel is provided by a speed sensor which is mounted on the vehicle in the vicinity of the associated wheel.

4. The detection method as claimed in claim 2, wherein the rotational speed of the wheel is provided by a means for measuring the angular position of said wheel, which means is an accelerometer mounted on the associated wheel unit.

5. The detection method as claimed in claim 1, wherein the synchronization of the emission of said series of messages with the angular position of the associated wheel consists in emitting said messages successively according to predetermined instantaneous angular orientations of the wheel which are supplied by the means for measuring the angular position of the wheel.

6. The detection method as claimed in claim 1, wherein said messages making it possible to establish said reference patterns and said evaluation patterns each comprise an identification reference.

7. The detection method as claimed in claim 1, further comprising a locating step which aims to determine the location of the wheel on the motor vehicle and which is performed if the location of the wheel has been estimated to have changed during the first comparison step and/or the second comparison step.

8. The detection method as claimed in claim 1, applied to a motor vehicle that has a plurality of wheels which are each associated with a wheel unit.

9. A motor vehicle comprising at least one central processing unit, one wheel unit which comprises an electronic assembly of sensors and which is mounted on a wheel of the motor vehicle, and one bidirectional radiofrequency communications assembly designed to ensure communication between the wheel unit and the central unit, characterized in that said central unit and/or said wheel unit and/or said communications assembly are suitably programmed to implement the method as claimed in claim 1.

10. A detection method for detecting a change in location of at least one wheel of a motor vehicle, said vehicle having at least:

a plurality of central processing units disposed in the vehicle;

a wheel unit mounted on a respective one of said at least one wheel of the motor vehicle, each wheel unit comprising an electronic assembly of sensors, a means for measuring an angular position of a respective one of said at least one wheel, and one bidirectional radiofrequency communications assembly adapted to communicate between the wheel unit and the plurality of central processing units, the method comprising at least:

a first preliminary configuration step, during which the wheel unit emits a series of messages to the central unit via the communications assembly, the series of messages being emitted when the vehicle is running, conforming to synchronization with the angular position of the associated wheel, and the central unit establishes and records a first reference pattern representative of the location of the wheel unit in the motor vehicle, by measuring the power of said received messages, a first transmission step, during which the wheel unit reproduces the emission of the series of messages emitted during the first preliminary configuration step, a first evaluation step, performed by the central unit, during which a first evaluation pattern is established by the central unit by measuring the power of the series of messages received during the first transmission step, and a first comparison step, performed by the central unit, during which the first evaluation pattern is compared with the first reference pattern to determine whether the location of the wheel has changed, wherein each of the plurality processing units of the motor vehicle communicates with the at least one wheel unit via the bidirectional communications assembly to consolidate said reference patterns and said evaluation patterns.

11. The detection method as claimed in claim 10, wherein the synchronization of the emission of said series of messages with the angular position of the associated wheel consists in emitting said messages successively with an inter-message delay that is determined according to the rotational speed of the wheel, so as to cover at least one revolution of the wheel concerned.

12. The detection method as claimed in claim 11, wherein the rotational speed of the wheel is provided by a speed sensor which is mounted on the vehicle in the vicinity of the associated wheel.

13. The detection method as claimed in claim 11, wherein the rotational speed of the wheel is provided by a means for measuring the angular position of said wheel, which means is an accelerometer mounted on the associated wheel unit.

14. The detection method as claimed in claim 10, wherein the synchronization of the emission of said series of messages with the angular position of the associated wheel consists in emitting said messages successively according to predetermined instantaneous angular orientations of the wheel which are supplied by the means for measuring the angular position of the wheel.

15. The detection method as claimed in claim 10, wherein said messages making it possible to establish said reference patterns and said evaluation patterns each comprise an identification reference.

16. The detection method as claimed in claim 10, further comprising a locating step which aims to determine the location of the wheel on the motor vehicle and which is performed if the location of the wheel has been estimated to have changed during the first comparison step and/or the second comparison step.

17. The detection method as claimed in claim 10, applied to a motor vehicle that has a plurality of wheels which are each associated with a wheel unit.

18. A motor vehicle comprising at least one central processing unit, one wheel unit which comprises an electronic assembly of sensors and which is mounted on a wheel of the motor vehicle, and one bidirectional radiofrequency communications assembly designed to ensure communication between the wheel unit and the central unit, characterized in that said central unit and/or said wheel unit and/or said communications assembly are suitably programmed to implement the method as claimed in claim 10.

* * * * *